April 8, 1969     A. L. LOCKER     3,436,936
COMBINATION HELMET AND LOCKING ATTACHMENT
Filed Oct. 30, 1967
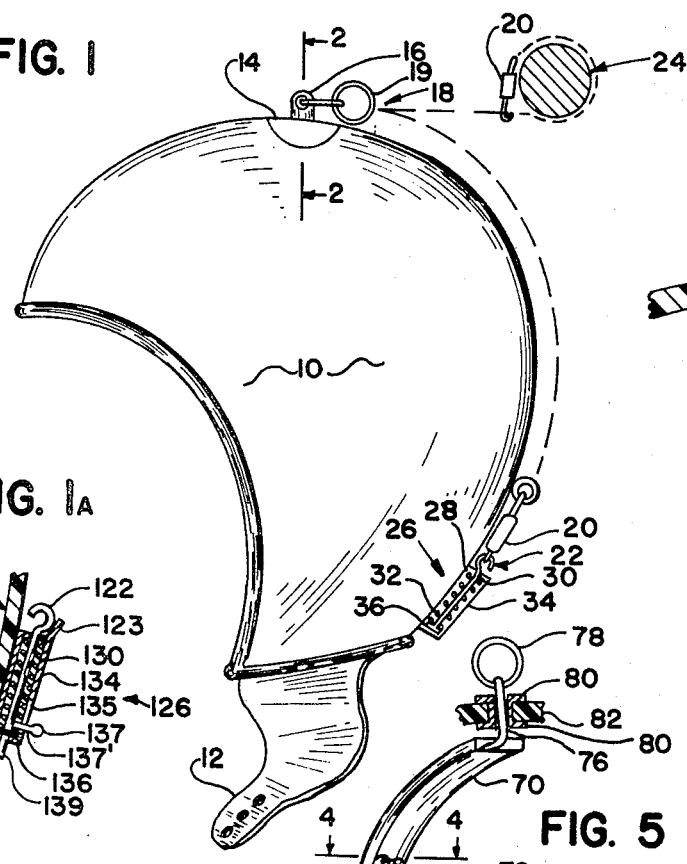
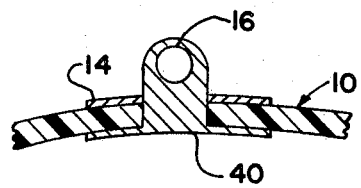
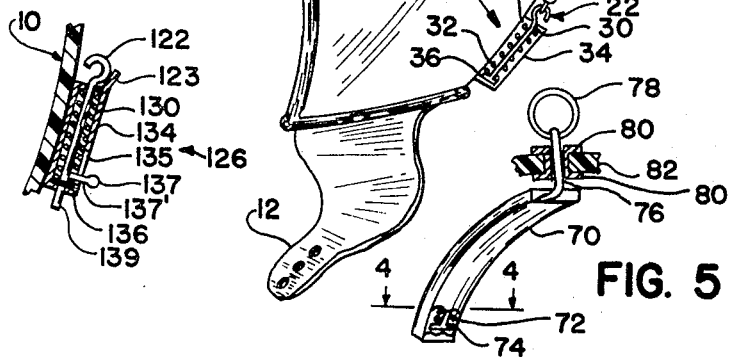
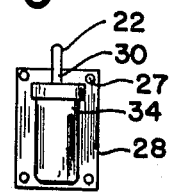
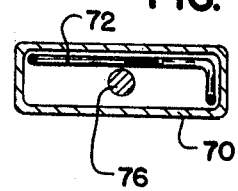
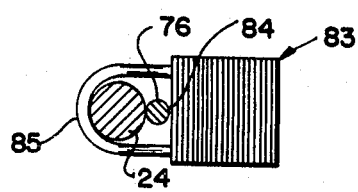
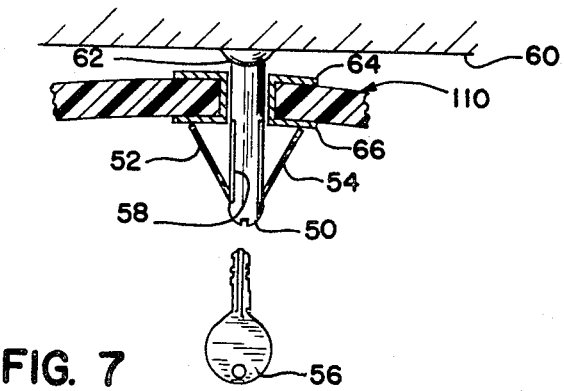
*INVENTOR.*
ARTHUR LEON LOCKER
BY.
MARCUS L. BATES April 8, 1969   A. L. LOCKER   3,436,936
COMBINATION HELMET AND LOCKING ATTACHMENT
Filed Oct. 30, 1967
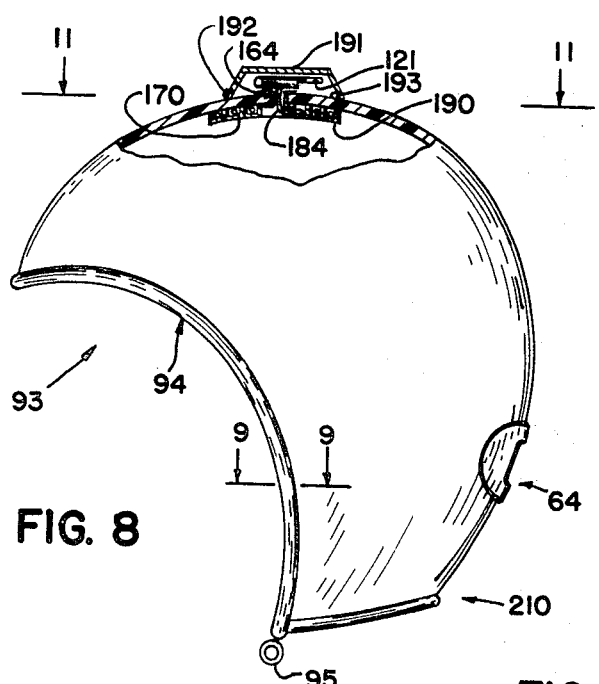
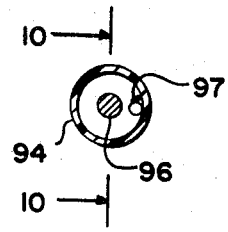
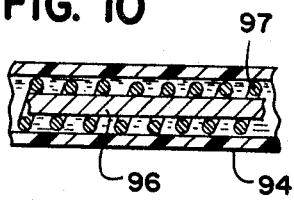
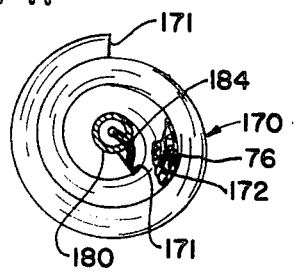
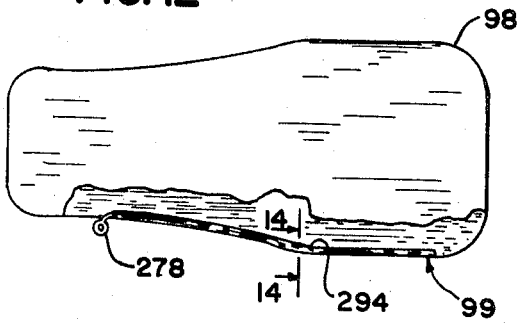
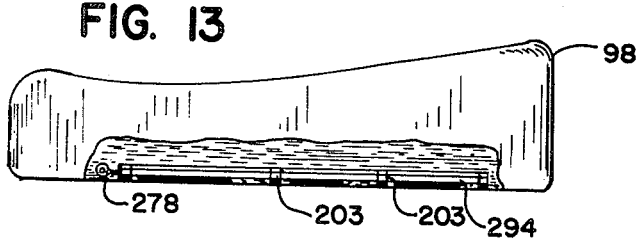
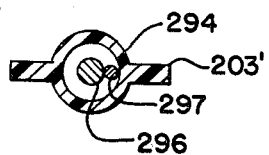
*INVENTOR.*
ARTHUR LEON LOCKER
*BY*
MARCUS L. BATES

United States Patent Office 3,436,936
Patented Apr. 8, 1969

3,436,936
COMBINATION HELMET AND LOCKING
ATTACHMENT
Arthur Leon Locker, P.O. Box 943,
McCamey, Tex. 79752
Filed Oct. 30, 1967, Ser. No. 678,865
Int. Cl. E05b 73/00; A42b 3/02
U.S. Cl. 70—59      10 Claims

ABSTRACT OF THE DISCLOSURE

A locking device which may be used in combination with a helmet, such as a crash helmet worn by motocycle drivers, in order to prevent theft or loss thereof. The locking device includes a flat plastic coated chain or cable, a resilient hold-down device at the rear of the helmet, and an anchoring means located at the top of the helmet; and with one terminal end of the chain being attached to the anchoring device and the remaining terminal end of the chain being attached to the resilient hold-down device, whereby the chain is maintained in tension and closely adjacent the surface of the helmet.

Another embodiment includes a flexible cable resiliently received in telescoping fashion within a housing. A terminal end of the cable is slidably affixed for limited movement within the housing with the cable protruding through the anchoring device. The remaining terminal end of the cable is in the form of an enlargement. When it is desired to secure the helmet to the vehicle so as to preclude loss thereof, the lock is either directly affixed to a portion of the motorcycle, or alternatively, the cable attached thereto may be looped around any structural part thereof and locked back onto itself, thereby leaving the helmet suspended in an upright position from the motorcycle.

BACKGROUND OF THE INVENTION

Motorcycle registrations have more than tripled in the past seven years, and by 1970 new registrations are expected to be rising by a million a year. On a per mile traveled basis, a motorcyclist's chances of being killed are about five times greater than those of an automobile driver. Statistics show that helmets of proper design reduce the risk of head injury by about thirty-three percent and the risk of death by about fifty percent. In view of these factors, recent legislation has been enacted in order to force the motorcyclist to wear a crash helmet. Motorcyclists do not like helmets for the reason that they are cumbersome to manage as well as being quite expensive. Because of their value, and because of a lack of a suitable locking means, helmets have become a ready target of petty thefts.

Motorcyclists who do wear helmets find them awkward and unwieldly to handle once they dismount the vehicle. The reason for this is because the helmet is bulky and ungainly and therefore must either be carried under the arm or by the chin strap. For example, upon entering a cafe, the helmet must be hung upon a hat rack, assuming one is available, or else held in one's lap, laid on the floor where they are easily scratched and marred, placed on the table, or in an adjacent chair where they are easily forgotten. When the helmet is left on the cycle it is either hung on the handlebar, laid on the seat, or secured to the frame by means of the chin strap. This permits foreign material as well as rain to collect within the helmet because it is generally suspended in the inverted position. Furthermore, the unsecured helmet is also an easy target for pilferage.

SUMMARY

The present invention is directed to a means for the protection of a helmet and includes a device which may be used in combination with the helmet whereby it may be locked to the frame or structure of a cycle by a chain, cable, or the like, which is incorporated into the combination.

It is therefore an object of the present invention to provide a theftproof device which enables a helmet to be attached to a vehicle.

Another object of the present invention is the provision of a locking device which may be incorporated into a crash helmet to thereby maintain the helmet secured to a convenient structure.

Another object of the present invention is the provision of a locking means associated with the crash helmet which is ornamental in appearance, attractive in design, durable in construction, and which is low in cost.

A further object of the present invention is the provision of a locking means associated with a crash helmet which enables the helmet to be releasably secured to the motorcycle while the helmet is maintained in an upright position.

A still further object of the present invention is the provision of a locking means which may be produced separate from the helmet and which may be easily and quickly attached to the helmet by the average cyclist.

The above objects are attained in accordance with the present invention by the provision of a flexible connector which is anchored to a crash helmet and which includes a terminal end thereof which may be removed from the helmet and secured to a motorcycle frame.

BRIEF DESCRIPTION OF THE DRAWINGS

FIGURE 1 is a side elevational view of a crash helmet which has a locking device installed thereon in accordance with the teachings of the present invention;

FIGURE 1A is a fragmentary representation of part of the device seen in FIGURE 1, showing a modification thereof partly in section;

FIGURE 2 is a cross-sectional view taken along line 2—2 of FIGURE 1;

FIGURE 3 is a plan view of part of the device seen in FIGURE 1;

FIGURE 4 is a cross-sectional view taken along line 4—4 of FIGURE 5, while;

FIGURE 5 is a partly cross-sectional and partly perspective view of another embodiment of the present invention;

FIGURE 6 depicts the practice of one of the above preferred embodiments, with a part of the device being shown in section;

FIGURE 7 shows still another embodiment of the present invention;

FIGURE 8 is a side elevational view of a crash helmet showing still another modification of the device, with some parts being broken away and other parts being shown in section in order to best illustrate the device;

FIGURE 9 is a partly cross-sectional view taken along line 9—9 of FIGURE 8;

FIGURE 10 is a cross-sectional view taken along line 10—10 of FIGURE 9;

FIGURE 11 is a partly cross-sectional view taken along line 11—11 of FIGURE 8, with some parts being broken away and other parts being omitted in order to better ilusrtate the device;

FIGURE 12 is a plan view of a motorcycle seat, with some parts being broken away to better illustrate the device;

FIGURE 13 is an elevational view of the seat seen in FIGURE 12 with some parts being broken away in order to disclose the details of some hidden parts; and FIGURE 14 is a cross-sectional view taken along line 14—14 of FIGURE 12, with some parts being omitted.

DESCRIPTION OF THE PREFERRED EMBODIMENTS

Looking to the details of FIGURES 1 through 3 wherein there is seen a helmet 10, generally called a crash helmet and which may be worn by motorcycle drivers, race car drivers, crop dusters, as well as other enthusiasts who participate in deadly sports wherein the head must be protected from possible injury. The helmet includes a chin strap 12 and a reinforcement 14. The reinforcement includes an apertured anchoring lug 16 which depends therefrom. A flat plastic coated chain generally indicated by the dashed line 18 is made of multiple links, one of which is seen at 19, and includes a terminal end attached to the apertured lug 16. The remaining terminal end of the chain is affixed to a lock 20. The lock may be in any suitable form so long as it has a releasable locking device, which for the purpose of illustration is shown in the form of a lock having a loop at one end, and a suitable aperture at the opposite end. The loop cooperates with a spring loaded hook 22 of a hold-down assembly, generally indicated by the arrow at numeral 26.

The hold-down assembly includes an attachment plate 28 and a shaft 30 which is a continuation of hook 22. The shaft, together with spring 32 are received within the tubular housing 34. The depending enclosed end of the shaft has an enlargement 36 thereon which is spring biased in a direction away from the hook 22.

As seen in FIGURE 2, the anchoring means includes spaced apart plates 14 and 40 which are superimposed upon one another in spaced apart relationship with the shell of the helmet 10 being compressed therebetween. Plate 14 may be suitable threaded so as to enable it to be screw fitted onto the outer periphery of the lug 16, or the plates may be secured in any suitable alternate manner.

Looking now to the details of FIGURE 1A it will be seen that the resilient means 26 may alternatively include a housing 134 which telescopingly receives a hook 122 having a depending end portion 139 thereon. A knob 137 is provided at the depending end of the lever 137' with the shaft being rigidly secured to the member 139. An outwardly directed guide member 123 forces the hook 122 closely adjacent to the outside peripheral wall surface of the shell 10. The hook 122 may be moved against spring 130 by either pushing the depending end 139 in an upward direction or by lifting the knob 137 with the finger.

Looking now to the details of FIGURES 4 and 5, there is seen another embodiment of the invention wherein an elongated, preferably flexible, housing 70 is received closely adjacent the inside peripheral wall surface 82 of a helmet such as seen at 10 in FIGURE 1. The housing is preferably flat so as to lie closely adjacent the inside peripheral wall surface of the helmet shell. An enlargement 74 is provided at one terminal end of the flexible cable 76 with the other terminal end having an enlargement such as indicated by the numeral 78 thereon. A reinforcement comprised of spaced apart plates, similar to a hollow rivet, compresses the material 82 of the shell therebewteen. As seen in FIGURE 4, a spring 72 similar to a spring associated with the clip of a gun, biases the enlargement 74 away from the reinforcement 80 to thereby maintain the enlargement 78 closely adjacent the reinforcement 80. As seen in FIGURE 6, a conventional lock 83 includes a body portion which releasably receives a loop 85 therein in the usual manner. The cable 76 may be placed closely adjacent a structure associated with the motorcycle, such as indicated by the numeral 24, to thereby maintain the cable 84 locked between the body and the structure.

Looking now to the details of FIGURE 7, there is seen illustrated a depending elongated locking member 50 having first and second pivoted wings 52, 54 pivotally attached near the outer terminal end thereof, and which may be retracted into the illustrated slots 58 when a key 56 is inserted into the key hole of the device and turned. The shell 110 of a helmet, such as the one indicated by numeral 10 in FIGURE 1, is provided with spaced apart washers or plate members 64 and 66 which forms an oval shaped aperture of sufficient size to slidably receive member 50, which also is oval shaped in cross section. The terminal end 62 of the device is pivotally attached to a structure 60 by the illustrated ball and socket joint 62.

Looking now to the details of FIGURE 8 in conjunction with FIGURES 9 through 11, wherein there is seen a helmet 210 having a leading edge 93 in the form of a tubular reinforcement 94. The leading edge is in the form of a hollow tube which slidably receives a cable 96. The cable includes an enlargement (not shown) at one terminal end thereof which is spring biased into retracted position by the coil spring 97. The free terminal end of the cable includes an enlargement 95 which may be locked to various structure of the motorcycle in the same manner of FIGURE 6.

For purposes of illustration, another embodiment is shown in conjunction with the helmet of FIGURE 8. It should be understood that only one of the embodiments would be incorporated into the single helmet. This second embodiment of the invention includes a lock having a loop 121 associated therewith and a cable 184 depending therefrom. The cable is slidably received within a housing 170 and is spring biased into the retracted position by means of the coil spring 172. Padding 190 maintains the spiraled housing concealed within the upper portion of the helmet. The cable extends through the reinforced member 164 which is provided in the shell of the helmet in the same manner as seen in FIGURES 5 and 7 at numerals 80 and 64, respectively. The lock is hidden by the low profile plastic cup like member 191 which is hinged at 192 and provided with a releasable snap type latch 193.

Where deemed desirable, the closely spiraled housing 170 may instead be spread apart whereby adjacent wall surfaces thereof are apart rather than lying closely adjacent each other.

Looking now to the details of FIGURES 12 through 14, wherein there is seen a seat 98 having an outer frame 99 which includes a cable housing 294 secured to the inside surface thereof in a manner whereby the cable and the enlargement are normally hidden from view. The embodiment shows an enlargement which may include a conventional lock where deemed desirable. Straps 203 secure the housing to the inside frame member. Alternatively, the housing 294 may be made of plastic with attachment means 203' outwardly depending from each side thereof and suitably apertured to enable attachment to the inside frame member. A cable 296 is slidably received within the housing and spring biased by the illustrated spring 297.

OPERATION

In the operation of the embodiment seen in FIGURES 1 through 3 the chain 18 normally lies closely adjacent the outer shell of helment 10 since the spring 32 biases hook 22 in a downward direction to thereby hold the lock and chain resiliently biased towards the hold-down assembly. When it is desired to leave the helmet secured to a motorcycle, the lock 20 is removed from the hook 22 and the chain 18 may be wrapped about any convenient structural portion of the motorcycle, such as a frame member 24. The loop of the lock 20, that is, the part which is released by turning the key, is then placed around the chain and locked, thereby preventing removal of the helmet. The plate 40 is an integral portion of the lug 16 and should be sufficient in area to develop enough bearing pressure with respect to the shell of the helmet to preclude the helmet being torn therefrom. While the anchoring means, chain, and hold-down device 26 are intended to be sold separate from the helmet as in a kit so as to enable individuals to install the locking mechanism upon their own helmet, it is also contemplated to install the device during manufacture of the helmet. In either event, the device may be simply installed on the helmet by merely drilling a hole in the upper portion of the helmet, applying epoxy resin near the formed aperture and on each opposite surface of the shell forming the helmet, after which plates 14 and 40 are suitably mated in the manner of FIGURE 2. Where deemed desirable, the outer periphery of the lug 16 and the aperture of the plate 14 may be threaded so as to enable plate 14 to be screw tightened against the shell 10. A locking nut could follow plate 14 in assembly, with a spanner type arrangement being employed to add to the difficulty of disassembly by unauthorized persons.

The apertured portion of lug 16 may be made into the form of a swivel which will preclude the possibility of a thief breaking the chain by twisting the helmet when the locking device is in use. This is best attained by rotatably positioning the lug 16 within an anchoring means such as seen at 64, 66; wherein the lug is provided with spaced apart shoulders which bear against the faces of plates 64, 66 respectively, to thereby capture the lug within the aperture and at the same time provide the required swivel motion.

In the hold-down means of either FIGURES 1 or 1A, the lock 20 is received by the hook with the length of the chain being selected so as to cause the spring to be compressed approximately one half the travel of the reciprocatingly received shaft 30. This maintains the chain closely adjacent the shell when the helmet is being worn. When it is desired to lock the helmet to the motorcycle, depending terminal end 139 is pushed in an upward direction thereby enabling the lock 20 to be removed from the hook, whereupon the lock may then be attached to any convenient part of the vehicle; or alternatively, the chain may be wrapped around some structure of the vehicle and the lock attached back to the chain itself, as seen at 24 of FIGURE 1. Alternatively, the hook may be released from the lock by merely pulling the handle 137 in an upward direction within the slot 135 to thereby move the hook against the spring a sufficient amount to enable release of the hook from the lock.

The chain is preferably fabricated from hard or high carbon steel, similar to the "handcuff chain" which is used by law enforcement officers to secure the handcuffs together. Each individual link of the chain is preferably twisted to provide a "flat chain," that is, one of reduced overall size. A chain having a clear plastic coating over a chrome plating provides an artistic arrangement which prevents marring the finish of the helmet.

In the embodiment of FIGURES 4 and 5, the housing 70 may be placed at any convenient location on the inside peripheral wall surface of the shell of the helmet 10. This includes winding the housing in a long spiral manner in a downward direction beginning at a location near the anchoring means 80 located in the topmost portion of the helmet. The anchoring means receives the plastic coated cable therethrough with one terminal end of the cable having the enlargement 78 thereon and the opposite terminal end of the cable having enlargement 74 thereon. Spring 72 normally maintains the cable retracted within the housing. The spring is preferably a long spiral wound spring similar in construction to that which is usually found in an ammunition clip. When it is desired to lock the helmet to the motorcycle, the enlargement 78 is pulled, thereby withdrawing cable 76 from the housing to enable the cable to be secured to the motorcycle using a conventional lock in the illustrated manner of FIGURE 6. The enlargement 74 should be of sufficient strength whereby should one try to break the cable, the enlargement will bear against the reinforcement 80 with the spring being fully compressed therebetween. Where desired, the enlargement can be apertured, and the depending end of the cable provided with a swedged ball to thereby provide a swivel joint which precludes the cable being twisted.

In the embodiment of FIGURE 7, the anchor 64 may be located at the upper portion of the helmet as in the before illustrated manner as seen at numeral 14 of FIGURE 1; or, alternatively, the anchor may be located at the lower rear portion of the helmet as illustrated by the arrow at numeral 64. When it is desired to secure the helmet to the motorcycle, the reinforced apertured anchor of the helmet is merely pushed against the member 50 whereupon the wings 52, 54 will be forced into their respective slots 58 as the anchor slides over the wings. The helmet may be left in this position until it is desired to replace it upon the head. At this time the wings 52, 54 are compressed towards one another by reaching the hand inside the helmet and biasing the wings toward their respective slots 58 to thereby enable the anchor 64 to ride thereover, thereby releasing the helmet from the lock. The locking member 50 should be placed with respect to structure 60 of the motorcycle whereby forced movement of ball joint 62 allows the locked helmet to be forced into the upright position so as to preclude accumulation of moisture and other debris therein.

Member 50 and the aperture formed by members 64, 66 are preferably each of an oval configuration, with the relative sizes being selected whereby the member 50 is slidably received by the aperture with sufficient tolerance therebetween to secure the helmet against rotation about the member 50. This configuration prevents the helmet from being rotated about member 50 into the inverted position.

Looking now to the embodiment seen at 93 in FIGURE 8, it should be understood that the edge portion 94 which normally adorns the leading edge of a helmet has been enlarged sufficiently so as to enable it to be hollow, while at the same time providing sufficient rigidity to this portion of the helmet. The cable 96 is slidably received within the hollow leading edge portion, and spring 97 maintains the cable slidably retracted therein in a manner similar to the cooperation between the cable and spring of FIGURES 4 and 5. Enlargement 95 enables the cable to be locked to structure of the motorcycle in a manner illustrated in FIGURE 6.

In the embodiment of FIGURE 11, the housing 170 is spirally wound about itself to thereby provide a flat profile which may be suitably received on the inside peripheral wall surface of the helmet near the upper extremity thereof in the illustrated manner of FIGURE 8. The cable cooperates with housing 170 in a manner similar to the cooperation of the cable, spring, and housing of FIGURES 4 and 5. It should be understood that only one of the locking devices, 93 or 170, are intended to be associated with the helmet of FIGURE 8.

In the embodiment depicted by numeral 170, the enlargement is in the form of a lock, and a cover plate 191 forms a housing in order to enhance the appearance of the helmet. When it is desired to lock the helmet to structure of the motorcycle, the housing 191 is unsnapped from the helmet at 193, bent back along the hinge 192, whereupon the lock is then pulled to thereby extend the cable from the housing and against the spring biasing means. The lock may then be suitably attached to the vehicle in a manner illustrated at numeral 24 of FIGURES 1 or 6.

It should be understood that the spiral 170 may also be extended further down into the helmet, if desired, by merely increasing the spacing between adjacent walls thereof. The padding 190 conceals the spirally wound housing. The housing is preferably made of plastic material to enable the housing and spring to be collapsed should one's head impact thereagainst with sufficient force. Therefore, with a minimum amount of padding 190, the padding together with the compressibility features of the housing and spring should obviate any objection that may arise to incorporating what otherwise may be a potential source of head injury into the inside of the helmet.

Looking at FIGURES 12 through 14, there is seen a seat having a housed cable attached to a frame member thereof with the housing being received on the inside portion of the seat where it is hidden from view. A lock attachment is secured to one depending end of the cable whereupon the cable may be pulled from the housing in a manner discussed in conjunction with FIGURES 5 and 11. The locking means 278 may be attached to an anchor such as seen in FIGURE 2 of the drawings. The housing is preferably provided with depending apertured ears 203' to enable the housing to be secured at a multiplicity of locations along its longitudinal length to thereby prevent, or at least discourage, theft of one's helmet when it is attached thereto. The advantage of the embodiment of FIGURES 12 through 14 lies in the reduced weight of the helmet, as well as the reduced number of parts which are associated with the helmet.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:
1. In a helmet having a rigid outer shell and adapted to receive the head of a wearer, with the shell having a top portion and a downwardly depending rearwardly disposed portion, with the rearwardly disposed portion having a lower edge portion, in combination;
   a locking device for securing the helmet to a structure;
   said locking device including an anchor means attached to the top portion of the helmet, a spring loaded means spaced apart from said anchor means and secured to the helmet, lock means, and an elongated flexible connector;
   said lock means being secured to a depending end of said elongated flexible connected, the remaining depending end of said elongated flexible connector being attached to said anchor means; whereby:
   said lock is adapted to secure said elongated flexible connector to a structure to thereby secure the helmet against removal therefrom, and said spring loaded means is adapted to maintain said elongated flexible connector resiliently attached to the helmet when the helmet is being worn.

2. The combination of claim 1 wherein said anchor means includes a plate like reinforcing member rigidly attached to the helmet, an apertured lug depending from the plate member, with said flexible connector having a terminal end secured to the apertured lug.

3. The combination of claim 1 wherein said anchor means includes spaced apart plates enclosing the shell therebetween, a lug interconnecting the plates and attached to a terminal end of the flexible connector; means forming aperture in said lug;
   said spring loaded means including a hook, a housing, and spring biasing means; said hook including a depending end with the depending end being received within said housing, with said housing including means by which it is rigidly secured in spaced apart relationship to the lower edge portion of the rearwardly disposed portion of the helmet; said spring biasing means adapted to urge said hook into the housing; whereby,
   said lock is releasably held by said hook when the locking device is stored.

4. The improvement of claim 2 wherein the flexible connector is a plastic coated chain.

5. The improvement of claim 1 wherein the spring loaded means includes a housing, an elongated biasing means coextensive with said housing, said flexible connector being slidably received within said housing, one terminal end of said flexible connector being attached to the spring for biasing the flexible connector into said housing;
   said anchor means being apertured for receiving said connector therethrough; whereby:
   said connector can be pulled outwardly from said housing to enable the lock to secure the remaining terminal end to a structure.

6. The improvement of claim 5 wherein the housing is secured to the inside peripheral wall surface of the helmet.

7. The improvement of claim 1 wherein the anchor means is comprised of spaced apart superimposed plates with the shell of the helmet being received therebetween; one plate being affixed to the outside surface of the helmet, an apertured lug depending from the upper plate;
   said connector having a terminal end attached to said lug with the remaining terminal end being attached to said lock means;
   said spring loaded means including a fastener having a depending portion received within a housing with said housing being rigidly secured to the marginal edge portion of the rearwardly disposed portion of the helmet; spring biasing means for urging the fastener into the housing; whereby,
   said connector cooperates with said spring loaded means which maintains the connector in tension and adjacent the outer periphery of the shell.

8. The improvement of claim 7 wherein said connector is a plastic coated flat chain and said anchor includes a swivel which prevents breakage of said chain by twisting.

9. The improvement of claim 5 wherein said housing is spirally wound about the inside peripheral wall surface of the helmet to thereby contribute to protection of the wearer from impact.

10. The improvement of claim 5 wherein said housing is fabricated from deformable material and is secured to the inside peripheral wall surface of the helmet to thereby add to the protection of the wearer against injury received from impact against the helmet.

References Cited

UNITED STATES PATENTS

| | | | |
|---|---|---|---|
| 2,350,799 | 6/1944 | Morris | 70—59 |
| 2,451,100 | 10/1948 | Lecompte | 70—49 |
| 3,156,239 | 11/1964 | Uribe | 2—6 X |

RICHARD E. MOORE, *Primary Examiner.*

EDWARD J. McCARTHY, *Assistant Examiner.*

U.S. Cl. X.R.

2—6